(12) United States Patent
Itabashi (10) Patent No.: US 7,019,766 B2
(45) Date of Patent: Mar. 28, 2006

(54) OPTICAL SCANNING DEVICE

(75) Inventor: Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/621,572

(22) Filed: Jul. 18, 2003

(65) Prior Publication Data

US 2004/0017469 A1 Jan. 29, 2004

Related U.S. Application Data

(62) Division of application No. 09/715,151, filed on Nov. 20, 2000, now Pat. No. 6,700,687.

(30) Foreign Application Priority Data

Nov. 29, 1999 (JP) .................................. 11-338811

(51) Int. Cl.
*B41J 27/00* (2006.01)

(52) U.S. Cl. ........................ 347/243; 347/259
(58) Field of Classification Search ........ 347/241–245, 347/256–261, 231, 263; 359/218, 212
See application file for complete search history.

(56) References Cited

U.S. PATENT DOCUMENTS

| | | | | |
|---|---|---|---|---|
| 4,796,963 | A * | 1/1989 | Yoshimura | 359/218 |
| 5,426,298 | A | 6/1995 | Sakuma et al. | 250/235 |
| 5,475,522 | A | 12/1995 | Itabashi et al. | 359/208 |
| 5,504,613 | A | 4/1996 | Itabashi et al. | 359/210 |
| 5,648,864 | A | 7/1997 | Itabashi | 359/205 |
| 6,195,190 | B1 | 2/2001 | Tachibe et al. | 359/216 |
| 6,381,057 | B1 | 4/2002 | Itabashi | 359/204 |
| 6,400,391 | B1 | 6/2002 | Suhara et al. | 347/244 |
| 6,429,956 | B1 | 8/2002 | Itabashi | 359/204 |
| 6,462,853 | B1 | 10/2002 | Hayashi | 359/205 |
| 6,469,772 | B1 | 10/2002 | Itabashi | 355/47 |
| 6,700,687 | B1 * | 3/2004 | Itabashi | 359/212 |

FOREIGN PATENT DOCUMENTS

| | | |
|---|---|---|
| JP | 7/244249 | 9/1995 |
| JP | 10-239611 | 9/1998 |
| JP | 11-160644 | 6/1999 |
| JP | 11-245442 | 9/1999 |

OTHER PUBLICATIONS

U.S. Appl. No. 09/827,097, filed Apr. 6, 2001, Ono et al. Pending.
U.S. Appl. No. 10/621,572, filed Jul. 18, 2003, Itabashi.
U.S. Appl. No. 10/840,369, filed May 7, 2004, Itabashi et al.

* cited by examiner

*Primary Examiner*—Hai Pham
(74) *Attorney, Agent, or Firm*—Oblon, Spivak, McClelland, Maier & Neustadt, P.C.

(57) ABSTRACT

An optical scanning device directs a light beam emitted from a light source to a mirror of a mechanical deflector through a first optical system, deflects the light beam in a main scanning direction by causing the light beam to be reflected by a mirror surface of the mirror, the angle of the mirror surface changing due to rotation of the mirror, and directs the deflected light beam through a second optical system to a surface to be scanned moving in a sub-scanning direction, the light source, first optical system and mechanical deflector being contained in a housing. The mechanical deflector is held in the housing through a holding member, and, also, material of the housing is different in heat conductivity from the holding member.

8 Claims, 5 Drawing Sheets

OPTICAL SCANNING DEVICE

This application is a divisional application of, and claims priority to, Ser. No. 09/715,151, filed Nov. 20, 2000 now U.S. Pat. No. 6,700,687 and claims the benefit of priority from the prior Japanese Patent Application 11-338811, filed Nov. 29, 1999; the entire contents of which are incorporated herein by reference.

BACKGROUND OF THE INVENTION

1. Field of the Invention

The present invention relates to an optical scanning device loaded in an electrophotographic image forming apparatus or the like.

2. Description of the Related Art

An electrophotographic image forming apparatus such as a digital copier, a laser printer or the like has an optical scanning device which deflects a light beam from a laser light source in a main scanning direction through a deflector, and forms a beam spot on a surface of a photosensitive body (surface to be scanned) moving in a sub-scanning direction (perpendicular to the main scanning direction). Thus, the optical scanning device forms a latent image of an image to be output on the surface of the photosensitive body.

As the deflector of the optical scanning device, a mechanical deflector employing a polygon mirror, a galvano-mirror or the like is used in general.

Figure 1:
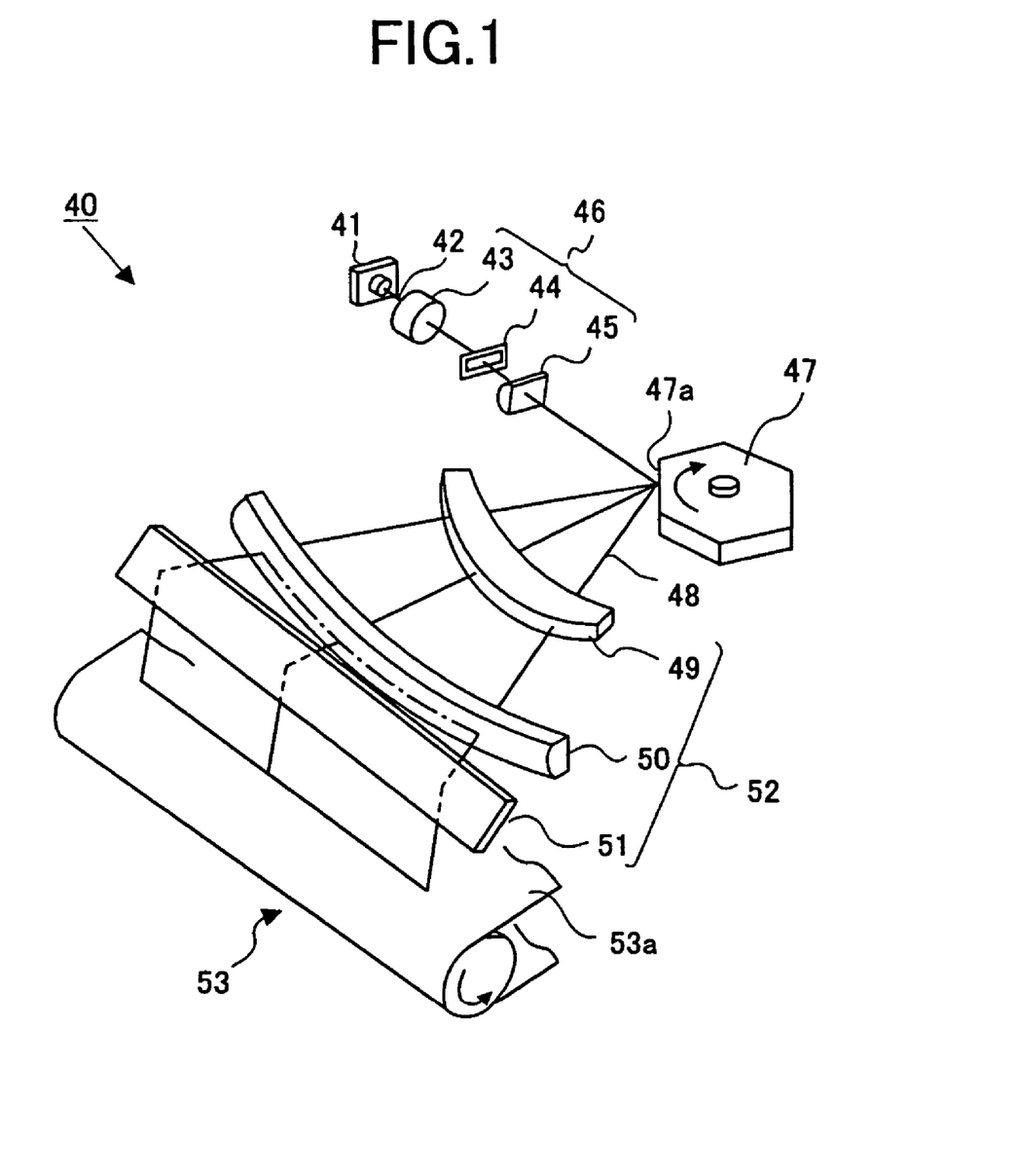
FIG. 1 shows an example of a configuration of an optical scanning device in the related art.

FIG. 1 shows an example of configuration of an optical scanning device in the related art.

The optical scanning device 40 causes a light beam 42 emitted from a laser light source 41 to be incident on a polygon mirror 47 rotating at high speed through a first optical system 46 consisting of a coupling lens 43, a diaphragm 44 and a line-image forming optical system 45, and causes the light beam to be reflected by a mirror surface 47a of the polygon mirror 47, the angle of which surface changes with the rotation of the polygon mirror 47. Thereby, the light beam 42 is deflected in the main scanning direction, and thus performs scanning repeatedly.

The light beam 48 reflected by the polygon mirror 47 passes through a second optical system consisting of an fθ lens 49, a long-dimension lens 50 and a turning mirror 51, and is used to scan a surface 53a (surface to be scanned) of a photosensitive body belt 53 moving in the sub-scanning direction.

At this time, the laser light source 41 is intensity-modulated according to an image to be output, and, thereby, an electrostatic latent image is formed on the surface 53a of the photosensitive body belt 53 in a form of a dot pattern by the blinking light beam 48.

As mentioned above, a mechanical deflector employing a polygon mirror or a galvano-mirror is used as a deflector of an optical scanning device in general. Because each of the polygon mirror and galvano-mirror is driven by a motor, heat is generated by the motor when it is driving the mirror.

Recently, as image output speed is increased, the driving speed of a deflector of an optical scanning device is increased. Thereby, the amount of heat amount generated by the motor of the deflector increases. Accordingly, it becomes to ignore the influence thereof on other optical components (a light source, a coupling lens, a diaphragm, a line-image forming optical system, an fθ lens, a long-dimension lens, and so forth) contained in a housing of the optical scanning device together with the deflector.

Heat generated by the motor is transmitted to the respective optical components mainly through the housing. Thereby, the respective optical components are heated, and, accordingly, problems may occur such as a shift of image position (focus shift), thickening of light beam, error of writing magnification, and so forth. As a result, image quality may be degraded.

Further, as the driving speed of a deflector is increased, a vibration generated thereby when the deflector is driven capable of being ignored. Accordingly, it has become impossible to use a plastic as a housing of an optical scanning device, and a metal housing has now therefor been employed. Because metal has a heat conductivity larger than that of plastic, heat from a motor of a deflector comes to be more easily transmitted by the housing. As a result, other respective optical components come to be affected by the heat from the motor of the deflector more seriously. Accordingly, the above-mentioned problems occur more remarkably.

Further, recently, lenses and/or mirrors which are main components of optical systems of an optical scanning device have been made of plastic, and are made to have spherical surfaces so that both high performance and a low cost of the device has resulted directed.

However, because plastic-made components are not superior in heat-resistant property in comparison with glass-made components, lenses and mirrors which are main components of optical systems are more seriously affected by heat from a motor.

Accordingly, the above-mentioned problems have occurred more often.

In the related art, Japanese Laid-Open Patent Application No. 7-244249 discloses an idea for avoiding influence of heat from a deflector.

According to Japanese Laid-Open Patent Application No. 7-244249, a scanning lens is separated from other optical components (mainly a deflector) in a housing, and, thereby, shifting of the scanning position and a change of diameter of light beam occurring due to shake of air surrounding the scanning lens are prevented. This technique is directed to eliminate the influence of air disturbances (air flow generated by the deflector) around the deflector due to rotation of a mirror of the deflector, basically.

However, according to this idea, although the deflector is separated from optical components such as the scanning lens, a turning mirror and so forth which direct light reflected by the deflector to a surface to be scanned, the deflector is not separated from other optical components such as a coupling lens, a diaphragm, a line-image forming optical system which direct a light beam to the deflector. Accordingly, those other optical components are affected by heat generated by the deflector.

As a result, in the housing, some optical components are affected by heat from the deflector, and the other optical components are not. Generally speaking, in order to prevent the characteristics of respective optical components included in a optical system from shifting unevenly, the design is such that the entirety of the optical system is in a uniform temperature environment, and, when the temperature environment changes, the system can be corrected as a whole. Accordingly, when some optical components are in a different temperature environment, a design for correction with respect to environment change becomes difficult to obtain.

SUMMARY OF THE INVENTION

The present invention has been devised in consideration of the above-mentioned problems, and, an object of the present invention is to provide an optical scanning device using a mechanical deflector employing a polygon mirror or a galvano-mirror in which heat generated by the mechanical deflector is prevented from being easily transmitted to other optical components contained in a housing together with the mechanical deflector, and, thereby, stable optical scanning without fluctuation due top temperature can be performed.

An optical scanning device according to the present invention directs a light beam emitted from a light source to a mirror of a mechanical deflector through a first optical system, deflects the light beam in a main scanning direction by causing the light beam to be reflected by a mirror surface of the mirror, the angle of the mirror surface changing due to rotation of the mirror, and directs the deflected light beam through a second optical system to a surface to be scanned moving in a sub-scanning direction, the light source, first optical system, mechanical deflector and second optical system being contained in a housing. The mechanical deflector is held in the housing through a holding member, and, also, the composition of the material of the housing is different in heat conductivity from the holding member.

Thereby, it is hard for heat generated by the mechanical deflector to be transmitted to the housing. Accordingly, it is possible to prevent the other optical components contained in the housing together with the mechanical deflector from being heated, and to prevent the performance of the optical scanning device from being degraded due to a rise in temperature of those optical components.

It is preferable that heat conductivity of the housing is smaller than heat conductivity of the holding member holding the mechanical deflector which is a heat source.

Thereby, it is head for heat generated by the mechanical deflector to be transmitted to the housing. Accordingly, it is possible to more effectively prevent the other optical components contained in the housing together with the mechanical deflector from being heated, and to prevent the performance of the optical scanning device from being degraded due to a rise in temperature of these optical components.

An optical scanning device according to another aspect of the present invention directs a light beam emitted from a light source to a mirror of a mechanical deflector through a first optical system, deflects the light beam in a main scanning direction by causing the light beam to be reflected by a mirror surface of the mirror, the angle of the mirror surface changing due to rotation of the mirror, and directs the deflected light beam through a second optical system to a surface to be scanned moving in a sub-scanning direction, the light source, first optical system, mechanical deflector and second optical system being contained in a housing. The mechanical deflector is directly mounted to the housing and, in addition, the material of the housing has a heat conductivity value smaller than that of a part of the mechanical deflector in contact with the housing.

Thereby, it is hard for heat generated by the mechanical deflector to be transmitted to the housing. Accordingly, it is possible to prevent the other optical components contained in the housing together with the mechanical deflector from being heated, and to prevent the performance of the optical scanning device from being degraded due to a rise in temperature of those optical components.

It is preferable that the mechanical deflector is covered by a cover having an optical window, and, thereby, an air flow occurring due to rotation of the mirror is kept within the cover.

Thereby, it is possible to prevent temperature rise of the other optical components due to convection of heated air, and, thus, to prevent the performance of the optical scanning device from being degraded. Further, because an air flow occurring due to rotation of the mirror is prevented from reaching the other optical components a shift in the scanning position, a change in diameter of light beam and so forth occurring due to shake of air in the proximity of those optical components can be prevented.

It is preferable that a cooling part forcibly cooling the mechanical deflector is provided.

Thereby, it is possible to prevent the housing and air in the housing from being heated by heat from the mechanical deflector, and to prevent temperature rise of the other optical components.

Other objects and further features of the present invention will become more apparent from the following detailed description when read in conjunction with the accompanying drawings.

DETAILED DESCRIPTION OF THE PREFERRED EMBODIMENTS

In the accompanying figures, the same reference numerals are given to the same parts/components, a duplicated description of which is omitted.

Figure 2A:
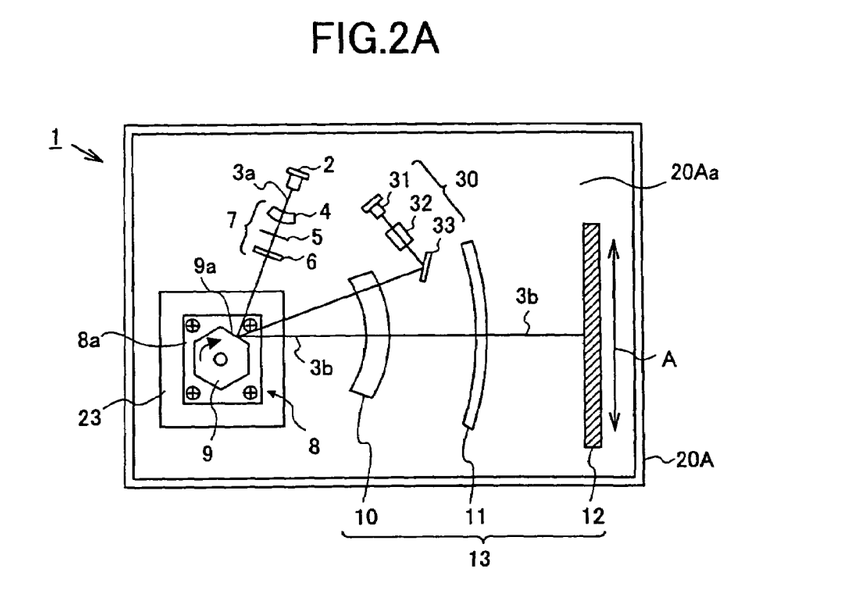
FIG. 2A shows a plan view of an optical scanning device in each of first and second embodiments of the present invention.
Figure 2B:
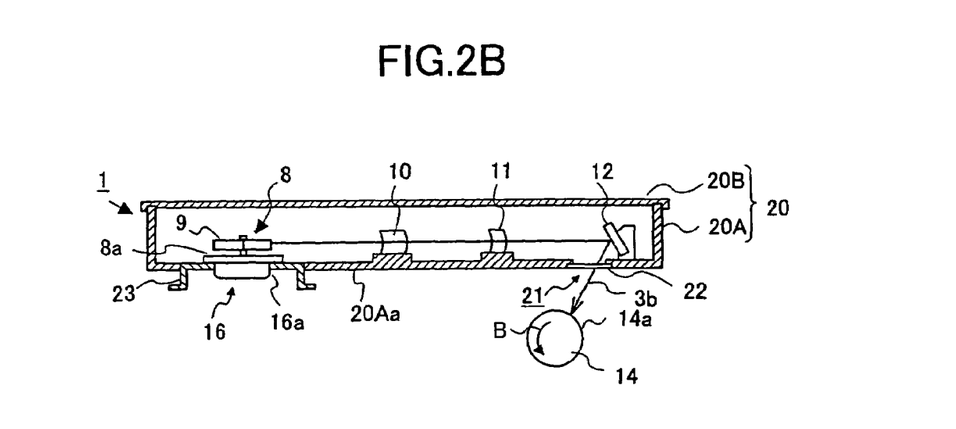
FIG. 2B shows a side elevational sectional view of the optical scanning device shown in FIG. 2A.

FIG. 2A shows a plan view (in a state in which a cover 20B is removed from a housing body 20A) of a first embodiment of an optical scanning device according to the present invention, and FIG. 2B shows a side elevational sectional view of the optical scanning device shown in FIG. 2A.

The optical scanning device 1 directs a light beam (light flux) 3a emitted from a laser light source 2 through a first optical system 7 to a polygon mirror 9 of a polygon scanner 8 which is a mechanical deflector, and causes the light beam to be reflected by a mirror surface 9a, the angle of which changes with rotation of the polygon mirror 9. Thereby, the light beam is deflected in a main scanning direction (the direction of the arrow A shown in FIG. 2A). At the same time, the deflected light 3b is directed through a second optical system 13 to a surface 14a (surface to be scanned) of a photosensitive body drum 14 which rotates in a sub-scanning direction (the direction of the arrow B shown in FIG. 2B). Thereby, optical scanning of the surface 14a is performed.

It is noted that, as an image output speed is increased recently, a combination of a plurality of light sources, a semiconductor laser array or the like comes to be used as the light source device of such an optical scanning device.

The laser light source 2, first optical system 7, polygon scanner 8 and second optical system 13 are contained in a single housing 20.

The first optical system 7 includes a coupling lens 4, a diaphragm 5 and a line-image forming optical system 6.

The second optical system 13 includes an fθ lens 10, a long-dimension lens 11 and a turning mirror 12.

The housing 20 consists of the housing body 20A in which the laser light source 2, first optical system 7, polygon scanner 8 and second optical system 13 are set and the cover 20B which covers a top opening of the housing body 20A.

A light beam exit window 21 is formed in a bottom of the housing body 20A. The light beam exit window 21 is closed by a transparent glass plate 22 for preventing dust, toner and so forth from entering the housing 20 therethrough.

The laser light source 2 emits the divergent light beam 3a. The light beam 3a from the laser light source 2 passes through the coupling lens 4 so as to be transformed into an approximately parallel light flux, and, is reduced in diameter to a predetermined light flux diameter by the diaphragm 5. Then, from the thus-obtained light flux, a line-like image extending in the main scanning direction is formed on the mirror surface 9a of the polygon scanner 8 by the line-image forming optical system 6 having refracting power in the sub-scanning direction.

It is also possible that the light beam 3a from the laser light source 2 is transformed into a divergent light flux or a convergent light flux by passing through the coupling lens 4.

The polygon scanner 8 includes the polygon mirror 9 and a motor 16 which rotates at high speed the polygon mirror 9 at a uniform velocity, and deflects an incident light flux at a uniform angular velocity.

The light beam (deflected light) 3b reflected by the polygon mirror 9 is incident on the turning mirror 12 after passing through the fθ lens 10 and long-dimension lens 11. Then, the incident light beam is reflected downward by the turning mirror 12, then, exits from the housing 20 through the light beam exit window 21, and, then, is incident on the surface 14a of the photosensitive body drum 14.

At this time, the laser light source 2 is intensity-modulated according to an image to be output, and, thereby, an electrostatic latent image of the output image is written to the surface 14a of the photosensitive body drum 14 in a form of a dot pattern by the blinking light beam 3b.

As the fθ lens 10 and long-dimension lens 11, optical components molded of plastic material are used.

Further, a synchronization detecting system 30 is provided. The synchronization detecting system 30 includes a synchronization sensor 31, an imaging component 32 and a mirror 33 which direct the reflected light flux from the polygon scanner 8 to the synchronization sensor 31.

As described above, in the polygon scanner 8, the motor 16 rotates the polygon mirror 9 at high speed. Accordingly, the motor 16 generates heat when driving the polygon mirror 9.

Figure 3:
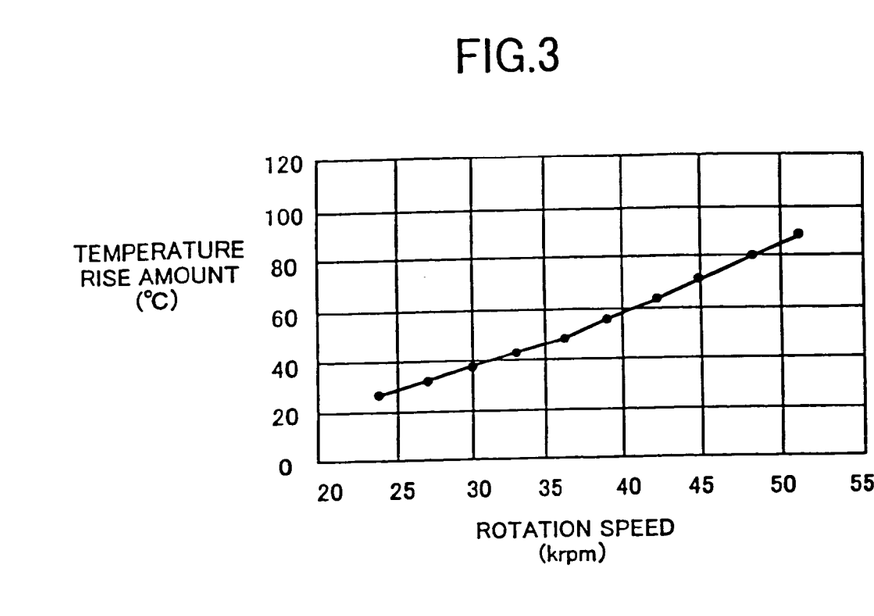
FIG. 3 shows a graph of relationship between a motor speed of a polygon scanner and a temperature of motor case thereof.

FIG. 3 shows a graph of a temperature rise amount (a rise in the amount from the temperature at the start of measurement) of a motor case 16a with respect to a motor speed in a case where the polygon scanner 8 is measured solely.

From the graph, it can be seen that the temperature rises as the motor speed increases. Further, the rise rate is not linear, but the rise rate increases as the motor speed increases. In this experiment, the motor case 16a is made of aluminum alloy.

The polygon scanner 8 is contained in the housing 20 in a condition in which it is disposed on the bottom plate 20Aa of the housing body 20A together with the other optical components such as the laser light source 2, coupling lens 4, diaphragm 5, line-image forming optical system 6, fθ lens 10, long-dimension lens 11, turning mirror 12 and so forth.

Accordingly, when heat generated by the motor 16 of the polygon scanner 8 was transmitted by the housing 20 to the other respective optical components, and, thereby, those optical components were heated, degradation (shift of imaging position, thickening of light beam, enlargement of magnification error and so forth) of performance of the optical scanning device 1 might occur, and image quality might be degraded.

According to the first embodiment of the present invention, the housing body 20A and a holding member 23 which holds the polygon scanner 8 are made to be separate parts, and the polygon scanner 8 is held in the housing 20 through the holding member 23. The material of the housing 20 is made to be different in terms of heat conductivity from the material of the holding member 23. Thereby, the bottom plate 20Aa of the housing body 20A is separated from the polygon scanner 6 and, as a result, heat generated by the polygon scanner 8 is not easily transmitted to the housing body 20A.

Figure 4:
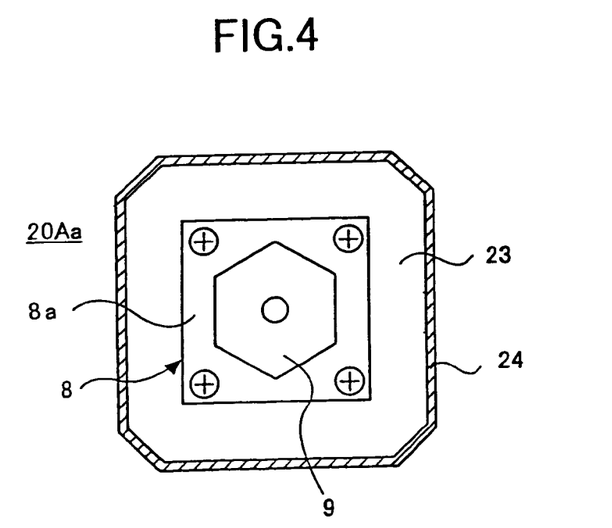
FIG. 4 illustrates a variant embodiment of the first embodiment shown in FIGS. 2A and 2B in which a heat insulating member is inserted between a holding member holding the polygon scanner and a housing bottom plate.

In order that heat generated by the polygon scanner 8 is not easily transmitted to the housing body 20A further positively, it is preferable to prevent the bottom plate 20Aa of the housing body 20A from coming into contact with the holding member 23 by a space provided therebetween. In this case, in order to prevent fine particles such as dusts or toner from entering the housing 20 through the space between the holding member 23 and bottom plate 20Aa, a heat insulating material 24 or the like may be inserted between the holding member 23 and bottom plate 20Aa, as shown in FIG. 4. Thereby, it is possible to obtain both dust proof function and heat insulating function.

According to a second embodiment of the present invention, the material of the housing 20 has the heat conductivity smaller than that of the material of the holding member 23. When the heat conductivity of the housing 20 is smaller than the heat conductivity of the holding member 23 holding the polygon scanner 8 which is a heat source, heat from the polygon scanner 20 is not easily transmitted to the housing 20. Accordingly, it is possible to effectively prevent the other respective optical components from being heated. As a result, it is possible to prevent performance of the optical scanning device 1 from being degraded.

For example, in a case where aluminum is used as the material of the holding member 23 holding the polygon scanner 8, it is possible that heat generated by the polygon scanner 8 is not easily transmitted to the housing 20 as a result of using iron or steel having the heat conductivity smaller than that of aluminum as the material of the housing 20. The following table shows typical materials and heat conductivity of each thereof:

| Material | Heat Conductivity (W/m · k) |
| --- | --- |
| Aluminum | 238 |
| Brass | 117 |
| Steel (Cu) | 49.3 |
| Steel (Ni—Cr) | 34.5 |
| Steel (Stainless) | 15.7 |
| Iron | 89.5 |
| Copper | 399 |

Figure 5A:
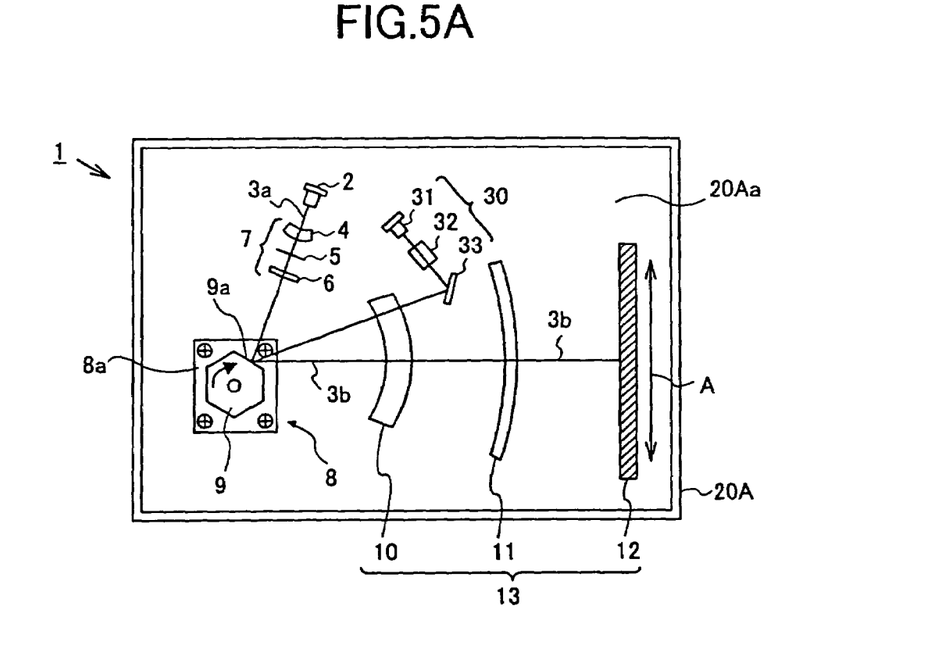
FIG. 5A shows a plan view of an optical scanning device in a third embodiment of the present invention.
Figure 5B:
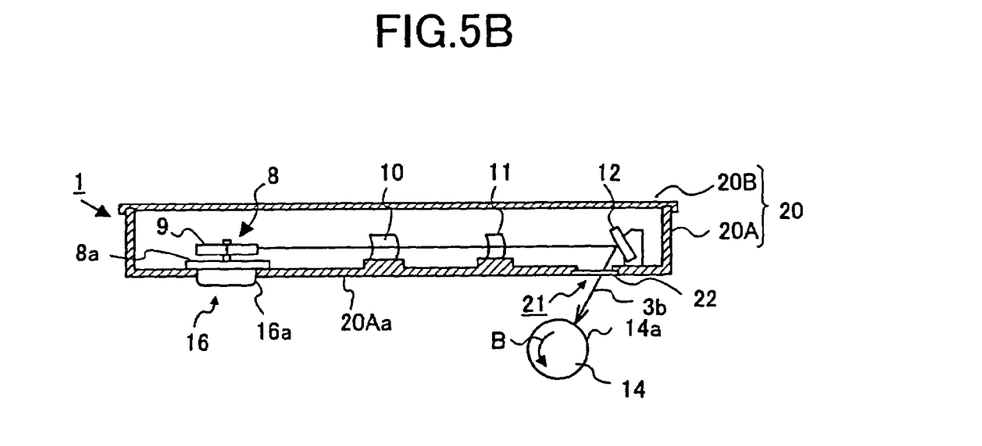
FIG. 5B shows a side elevational sectional view of the optical scanning device shown in FIG. 5A.

According to a third embodiment of the present invention, as shown in FIGS. 5A and 5B, the polygon scanner 8 is directly mounted to the housing body 20A, and, also, the material of the housing 20 is made to be one having the heat conductivity smaller than those of the materials of contacting parts, that is, the motor case 16a and a mounting plate 8a.

Accordingly, in a case where the polygon scanner 8 is directly mounted to the housing body 20A, heat from the polygon scanner 8 is not easily transmitted to the housing 20 when the heat conductivity of the housing body 20A is smaller than the heat conductivities of the motor case 16a and mounting plate 8a. As a result, it is possible to effectively prevent a rise in temperature of the other respective optical components, and to prevent the performance of the optical scanning device 1 fro; being degraded.

Thus, by preventing the heat generated by the polygon scanner 8 from being easily transmitted to the housing body 20A, it is possible to prevent the other optical components in the housing 20 from being heated due to heat conduction through the housing body 20A.

However, when the polygon mirror 9 rotates at high speed, the surrounding air is stirred, and, thereby, convection of air occurs. As a result, heated air surrounding the motor 16 reaches the proximity of the other optical components through the air convection, and, the other optical components are heated thereby.

Figure 6:
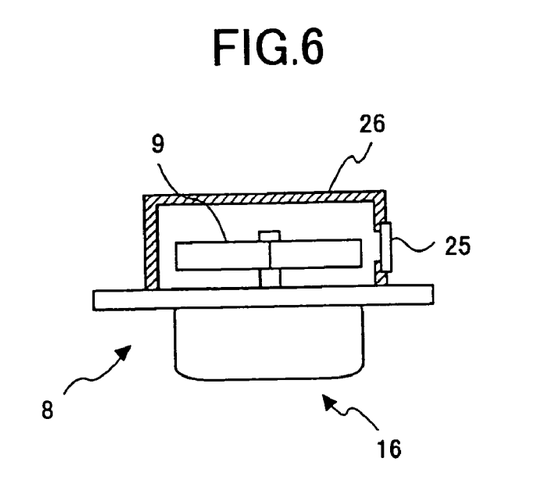
FIG. 6 illustrates a fourth embodiment of the present invention in which a polygon mirror of the polygon scanner is covered by a cover having an optical window.

In order to prevent air convection due to rotation of the polygon mirror 9 from occurring, it is preferable to cover the polygon mirror 9 of the polygon scanner 8 by a cover 26 having an optical window 25, as shown in FIG. 6, as in a fourth embodiment of the present invention. Thereby, it is possible to keep the air flow occurring due to rotation of the polygon mirror 9 within the cover 26.

As a result of the cover 26 being spatially separating the polygon mirror 9 from the other optical components, when air surrounding the polygon mirror 9 is stirred, influence thereof is prevented from extending to the outside of the cover 26. Accordingly, a rise in temperature of the other optical components by heated air is prevented. Further, because an air flow occurring due to rotation of the polygon mirror 9 does not reach the proximity of the fθ lens 10, long-dimension lens 11, turning mirror 12 and so forth a shift in scanning position, a change in the diameter of light beam and so forth can be prevented occurring due to air currents being generated in the proximity of those optical components.

Figure 7:
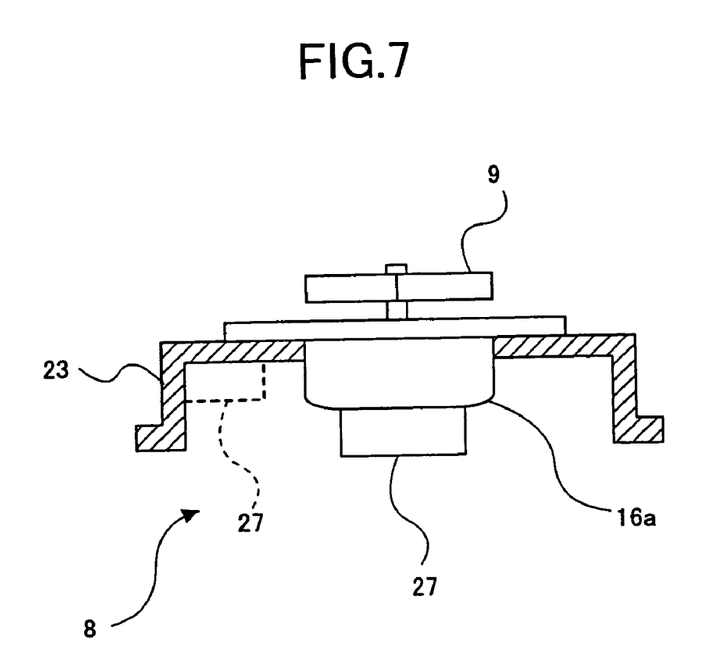
FIG. 7 illustrates a fifth embodiment of the present invention in which a cooling part forcibly cooling the polygon scanner is provided.

According to a fifth embodiment of the present invention, by positively cooling the motor case 16a or the holding member 23 of the polygon scanner 8 by a cooling part 27 as shown in FIG. 7, it is possible to lower the temperature of the polygon scanner 8 itself which is wheat source, or the holding member 23. Thereby, it is possible to prevent the housing 20 and air in the housing 20 from being heated by heat from the polygon scanner 8, and to prevent a rise in temperature of the other optical components.

As the cooling part 27, a cooling fan, a Peltier device or the like can be employed.

However, when the cooling fan is used as the cooling part 27, it is preferable that the outer surface of the motor case 16a which is a heat source, or the like is forcibly cooled from the outside of the housing 20 in order to prevent air convection from occurring inside the housing 20.

Although the optical scanning devices employing the polygon scanners have been described, the present invention can also be applied to optical scanning devices including mechanical deflectors employing galvano-mirrors.

The present invention is not limited to the above-described embodiments, and variations and modifications may be made without departing from the scope of the present invention.

The present application is based on Japanese priority application No. 11-338811, filed on Nov. 29, 1999, the entire contents of which are hereby incorporated by reference.

What is claimed is:

1. An optical scanning device comprising:
   a light source;
   a first optical system;
   a second optical system; and
   a mechanical deflector, wherein,
   a light beam emitted from said light source is directed to a mirror of said mechanical deflector through said first optical system,
   the light beam is deflected in a main scanning direction by causing the light beam to be reflected by a mirror surface of said mirror, the angle of said mirror surface changing due to rotation of said mirror,
   the deflected light beam is directed through the second optical system to a surface to be scanned moving in a sub-scanning direction,
   said light source, first optical system, mechanical deflector and second optical system are contained in a housing,
   said mechanical deflector is directly mounted to said housing, and
   material of said housing has heat conductivity smaller than that of a part of said mechanical deflector in contact with said housing so as to reduce heat transfer from the mechanical deflector to components of the first optical system and of the second optical system through the housing.

2. The optical scanning device as claimed in claim 1, wherein said mechanical deflector is covered by a cover having an optical window, and, thereby, an air flow occurring due to rotation of said mirror is kept within said cover.

3. The optical scanning device as claimed in claim 1, wherein a cooling part forcibly cooling said mechanical deflector is provided.

4. A method for performing optical scanning, comprising:
   mounting a deflector mounting plate of a mechanical deflector directly to a bottom housing plate of a housing; and
   rotating a mirror of the mechanical deflector to deflect a light beam to a surface to be scanned wherein heat created from a rotation of the mirror is transferred through the deflector mounting plate, the bottom hous ing plate having a heat conductivity smaller than a heat conductivity of the deflector mounting plate.

5. The method of claim 4, wherein a cover is provided to the mechanical deflector to substantially contain an air flow resulting from the rotation of the mirror.

6. The method of claim 4, further comprising: forcibly cooling the mechanical deflector with a cooling unit.

7. The method of claim 6, wherein the cooling unit is positioned at an exterior surface of the housing.

8. The method of claim 6, wherein the cooling unit is arranged as one of a cooling fan and a Peltier device.

* * * * *